2,805,234

PROCESS FOR PRODUCTION OF TETRA-ALKYL TIN COMPOUND HAVING AT LEAST 10 CARBON ATOMS PER ALKYL RADICAL

Carl R. Gloskey, Avenel, N. J., assignor to Metal & Thermit Corporation, New York, N. Y., a corporation of New Jersey No Drawing. Application May 12, 1954,
Serial No. 429,399

6 Claims. (Cl. 260—429.7)

The present invention relates to a process of preparing tetra-alkyl tin compounds containing more than ten carbon atoms per alkyl chain.

In accordance with the present invention, the tetra-alkyl tin compounds wherein each alkyl group contains more than 10 carbon atoms are prepared by reacting an alkyl halide, preferably a chloride, with stannic chloride in the presence of sodium while elevating the temperature of the reaction above the melting point of the sodium. Mixtures of alkyl halides containing different amounts of carbon atoms in the alkyl chain may be utilized. As used herein the term "alkyl," when referring to the process of the present invention, means only those alkyl compounds averaging 10 or more carbon atoms.

Tetraalkyl tins have previously been made by reacting an alkyl chloride, tin tetrachloride and solid sodium at relatively low temperature. When the alkyl groups contain 10 or more carbon atoms, however, this process is unsatisfactory because the yield of desired product is low and there is formed as by-product a large amount of high boiling hydrocarbon which is extremely difficult to remove. We have found that these $C_{10}$ and higher products are produced in good yield and purity when the reaction is carried out using molten sodium at a temperature above about 100° C. This is a surprising result in view of the fact that when it is attempted to prepare the lower homologues, such as tetrabutyl tin, yields fall off rapidly with increasing reaction temperature above about 50° C.

The reaction for the formation of a tetraalkyl tin is clearly illustrated by the following equation:

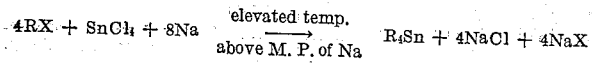

In the above equation, R represents an alkyl radical having more than 10 carbon atoms or a mixture of alkyl radicals averaging more than 10 carbon atoms, thus R may be, for example, $C_{10}H_{21}$, $C_{11}H_{23}$, $C_{12}H_{25}$, $C_{15}H_{31}$, $C_{18}H_{37}$, etc. X represents a halide.

A preferred method of manufacturing a tetraalkyl tin compound wherein each alkyl radical contains more than 10 carbon atoms comprises reacting a slurry of liquefied sodium dispersed in an inert hydrocarbon solvent with a solution of stannic chloride and an alkyl halide containing more than 10 carbon atoms at elevated temperatures in excess of the melting point of the sodium, filtering off the salt residues formed during the reaction, stripping the solvent from the reaction product, and recovering a substantially pure tetraalkyl tin. More specifically, tetra-alkyl tin compounds are obtained by heating a mixture of sodium and an inert hydrocarbon solvent to a temperature above the melting point of the sodium, about 100° C., agitating said mixture to disperse the liquefied sodium in the solvent and slowly adding a solution composed of stannic chloride and an alkyl halide whereby reaction occurs rapidly and heat is evolved, maintaining the temperature at reflux for a short time after the cessation of heat evolution to permit completion of the reaction, filtering the reaction slurry in order to rid it of sodium chloride, residual sodium, and other insoluble by-products formed during the reaction, distilling off the solvent and any hydrocarbon by-products formed during the reaction, and recovering a substantially pure tetra-alkyl tin. Any tetra-alkyl tin retained in the salt residue after the filtration step can be recovered by a Soxhlet type extraction using the aforesaid solvent as a vehicle. The filtration may be carried out in a centrifuge. If the salt residues do not contain much metallic sodium an aqueous extraction of the reaction mixture may be used, instead of filtration, to remove the water soluble salts. If much metallic sodium is present it is usually better to filter. The distillation process whereby the solvent and any hydrocarbon by-products formed during the reaction are separated from the reaction product is best carried out in vacuo, the temperature being dependent on the particular alkyl halide utilized since this determines the nature of the high boiling hydrocarbon formed as by-product. For example, lauryl chloride requires the use of a temperature of about 180° C. at 5 mm. Hg absolute pressure. The exothermic nature of this reaction requires the slow addition of the stannic chloride-alkyl halide solution to the sodium-hydrocarbon solvent slurry. The addition speed should be such that the heat transfer capacity of the condenser is not exceeded by the heat of reaction of the process. Under these conditions refluxing occurs, the temperature remains substantially constant at the boiling point of the mixture, but no solvent is lost. Thus any undue elevation in temperature is avoided which might result in the formation of undesirable hydrocarbon by-products contaminating the final product. Since reaction between molten sodium, stannic chloride and an alkyl halide as exothermic, the completion of the reaction is easily ascertained by the cessation of the evolution of heat.

A feature of the present invention resides in the utilization of temperatures above the melting point of sodium. The maintenance of temperatures above about 100° C. is a necessary expedient of the invention, a temperature of about 110° C. being preferred, and temperatures up to about 132° C. having been found satisfactory. The particular reaction temperature employed is dependent on the solvent or diluent utilized during the reaction. For example, toluene uses a reaction temperature of 110° C., iso-octane, a temperature of 125° C., and xylene, a temperature of 132° C. When reacting a mixture of alkyl halides of differing chain lengths it is found that the product varies somewhat with temperature; the higher the temperature (up to about 132° C.) the more of the longer groups will be found in the product. This condition exists when reacting commercial lauryl chloride which is essentially a mixture of alkyl chlorides from $C_{12}$ to $C_{18}$, averaging about $C_{13.2}$.

Another feature of the present invention resides in the use of an inert hydrocarbon solvent or diluent during the reaction. The presence of said solvent serves many purposes. Firstly, it functions as a liquefying vehicle for the molten sodium. Secondly, it effectively reduces the viscosity of the reaction mixture, thereby enabling the reaction to proceed to completion and being productive of greater yields of the tetraalkyl tin compound. Thirdly, it makes easier the removal of heat of reaction, especially when a diluent is chosen which boils at about the desired reaction temperature. Suitable solvents include toluene, iso-octane, xylene and other aliphatic and aromatic hydrocarbons. The solvent can be easily removed from the reaction product by distillation at elevated temperatures in the presence or absence of pressure or by other suitable means.

The tetra-alkyl tin compounds obtained by this process are produced in yields of about 60–85%. Stoichiometric amounts of reactants in practicing this process are preferred, although a moderate excess of any reactant is not prohibited.

The following examples are further illustrative of the present invention; however, it will be understood that the invention is not limited thereto:

EXAMPLE I

Nineteen hundred grams of toluene and 250 grams of sodium are charged into the reactor assembly and heated to 100° C. After the sodium has liquefied, the agitator is started, dispersing the sodium into small globules. A solution of 326 grams of stannic chloride and 1025 grams of lauryl chloride (stoichiometric amounts) is added to the sodium-toluene slurry at such a rate that the heat transfer capacity of the condenser is not exceeded by the heat of reaction of the process which is maintained at a temperature of 110° C. After the reactants have been added, the reaction is allowed to continue until the heat evolution subsides plus thirty minutes. The reacted slurry is then filtered to separate the tetralauryl tin toluene solution from the sodium chloride and any residual sodium. A distillation process is used to separate the toluene vehicle and hydrocarbon by-products at 180° C. and 5 mm. Hg pressure (abs.) pot conditions in a single plate still. Tetralauryl tin retained in the salt residue after the filtration step can be recovered by a Soxhlet type extraction using toluene as a vehicle.

The yield of tetralauryl tin was 69.2%.

The following table represents additional Examples 2-10 inclusive of the present invention, wherein the apparatus, procedure and ingredients of Example I was utilized except as specified in the table. The conditions of reaction were varied by utilizing different solvents and reaction temperatures as indicated in the table. The quantities of the reactants for each example was also varied to show effect, if any, on the final yield of tetralauryl tin. The amount of sodium in each case was that required to react with all of the halogen. An analysis of tetralauryl tin obtained by each experiment is clearly illustrated in the table. Other pertinent information appears under the title "Remarks."

$R_2Sn(SR')_2$ wherein R is an alkyl radical and R' is any other organic radical, and the like.

While the invention has been described with reference to various examples and embodiments, it will be apparent to those skilled in the art that various modifications may be made, and equivalents substituted therefor, without departing from the principles and true nature of the present invention.

What is claimed by Letters Patent is:

1. A method of preparing tetra-alkyl tin compounds comprising reacting alkyl halides averaging at least 10 carbon atoms per alkyl radical with stannic halide in the presence of sodium at temperatures from about 110° C. to 132° C.

2. A method of preparing a tetra-alkyl tin compound which comprises reacting a mixture of alkyl halide averaging more than ten carbon atoms per alkyl radical with stannic halide in the presence of sodium at temperatures from about 110° C. to 132° C.

3. A method of preparing a tetra-alkyl tin compound which comprises reacting an alkyl halide having at least 10 carbon atoms per alkyl radical with stannic halide in the presence of sodium liquefied in an inert diluent, at temperatures from about 110° C. to 132° C.

4. A method of manufacturing a tetra-alkyl tin compound containing more than ten carbon atoms per alkyl radical which comprises reacting a slurry of liquefied molten sodium dispersed in an inert hydrocarbon solvent with a solution of stannic halide and an alkyl halide having at least 10 carbon atoms per alkyl radical at temperatures from about 110° C. to 132° C., filtering off the salt residues formed during the reaction, stripping the solvent from the reaction product, and recovering tetra-alkyl tin compound.

5. A method of preparing a tetra-alkyl tin compound comprising reacting alkyl halides averaging at least 10 carbon atoms per alkyl radical with stannic halide in the presence of molten sodium, liquefied in an inert diluent at elevated temperatures from about 110° C. to 132° C.

6. A method of manufacturing a tetra-lauryl tin which comprises reacting a slurry of liquefied molten sodium

Table I

| Ex. | Solvent | Temp., °C. | Wt. SnCl$_4$, grams | Wt. LaCl, grams | Percent Sn Yield | Percent Sn | Percent Cl | Sp. Gr. @ 25° C. | Gardner Color [1] | Chill Point, °C. | Gravimetric Yield | Remarks |
|---|---|---|---|---|---|---|---|---|---|---|---|---|
| 1 | Toluene | 110 | 326 | 1,025 | 57.1 | 12.19 | 0.18 | 0.931 | 3 | 0 | 69.2 | |
| 2 | do | 110 | 326 | 1,025 | 66.5 | 13.30 | 0.36 | 0.945 | 3 | −7 | 74.5 | |
| 3 | do | 110 | 261 | 820 | 66.3 | 14.68 | 0.07 | 0.940 | 8 | | 68.0 | |
| 4 | do | 110 | 131 | 410 | 56.7 | 12.51 | 0.08 | 0.914 | 1 | | 67.0 | Increased amount of toluene to increase fluidity. |
| 5 | do | 110 | 342 | 1,025 (5% excess). | 54.4 | 11.26 | 0.56 | 0.929 | 4 | −7 | 75.5 | |
| 6 | do | 110 | 326 | 1,045.5 (2% excess). | 66.1 | 13.13 | 0.12 | 0.938 | 3 | −10 | 75.2 | |
| 7 | do | 110 | 326 | 1,025 | 55.5 | 13.80 | 0.14 | 0 924 | 4 | 4 | 60.3 | Utilized a lauryl chloride purchased from another source (du Pont in lieu of Hooker). |
| 8 | do | 110 | 131.0 | 498.0 (LaBr) | 76.8 | 13.50 | 6.64 | 0.971 | 4 | 3 | 85.1 | Used lauryl bromide in lieu of lauryl chloride. Final product contained a considerable amount of La$_4$SnBr. |
| 9 | Xylene | 132 | 131.0 | 409.6 | 45.0 | 10.25 | 0.28 | 0.928 | 7 | −9 | 65.4 | |
| 10 | Iso-octane | 125 | 131.0 | 409.6 | 59.6 | 13.28 | 0.16 | 0.950 | 1 | 15 | 67.2 | |

[1] As determined by method given in Federal Specification TT-P-141b, Method 424.8.

This table discloses the advantages flowing from the present invention. Firstly, the yield of the tetralauryl tin is within the range of 60–85%. Secondly, the Gardner color of the tetralauryl tin is about 3, indicative of a purer product. This table further shows that it is not necessary to use an excess of either alkyl halide or tin tetrahalide, the yield when using stoichiometric amounts or an excess of either being substantially the same, as exemplified by a comparison of Examples 2, 5 and 6.

The tetra-alkyl tin compounds of the present invention may be utilized as intermediates in the synthesis of other chemicals such as dialkyl tin dichloride ($R_2SnCl_2$), dispersed in toluene with a solution of stoichiometric amounts of stannic chloride and lauryl chloride, at a temperature of about 110° C., filtering off the salt residues formed during the reaction, distilling off the toluene from the reaction product, and recovering tetra-lauryl tin.

References Cited in the file of this patent

UNITED STATES PATENTS

| | | |
|---|---|---|
| 2,431,038 | Harris | Nov. 18, 1947 |
| 2,665,286 | Passino et al. | Jan. 5, 1954 |
| 2,675,398 | Ramsden et al. | Apr. 13, 1954 |
| 2,675,399 | Ramsden et al. | Apr. 13, 1954 |